United States Patent [19]
Grivna

[11] Patent Number: 5,982,786
[45] Date of Patent: Nov. 9, 1999

[54] CIRCUITS AND METHODS FOR FRAMING ONE OR MORE DATA STREAMS

[75] Inventor: Edward L. Grivna, Brooklyn Park, Minn.

[73] Assignee: Cypress Semiconductor Corp., San Jose, Calif.

[21] Appl. No.: 08/976,072

[22] Filed: Nov. 21, 1997

[51] Int. Cl.[6] .................................................. H04J 3/06
[52] U.S. Cl. ........................................ 370/503; 375/354
[58] Field of Search ................................... 370/304, 305, 370/306, 503, 506, 509, 512, 513, 514; 375/354, 355, 364, 368, 369, 370, 372; 395/898

[56] References Cited

U.S. PATENT DOCUMENTS

| | | | |
|---|---|---|---|
| 5,010,559 | 4/1991 | O'Connor et al. | 375/116 |
| 5,175,767 | 12/1992 | Landry | 380/48 |
| 5,367,544 | 11/1994 | Bruekhimer | 375/116 |
| 5,598,424 | 1/1997 | Erickson et al. | 371/48 |
| 5,608,734 | 3/1997 | Sandler et al. | 370/509 |
| 5,661,763 | 8/1997 | Sands | 375/368 |
| 5,666,547 | 9/1997 | James et al. | 395/898 |
| 5,671,223 | 9/1997 | Shachar et al. | 370/395 |
| 5,694,056 | 12/1997 | Mahoney et al. | 326/38 |
| 5,778,000 | 7/1998 | Dosiere et al. | 370/512 |
| 5,790,607 | 8/1998 | Burke et al. | 375/355 |
| 5,838,631 | 11/1998 | Mick | 365/233 |
| 5,854,794 | 12/1998 | Pawloski | 370/509 |

OTHER PUBLICATIONS

Edward Grivna, U.S.S.N. 08/975,644 Circuits and Method for Framing One or More Data Streams, filed Nov. 21, 1997.

*Primary Examiner*—Ajit Patel
*Assistant Examiner*—Brian Nguyen
*Attorney, Agent, or Firm*—Christopher P. Maiorana, P.C.

[57] ABSTRACT

A circuit and method for framing an input data stream to a periodic signal. The circuit comprises a register circuit, a logic circuit and a multiplexor circuit. The register circuit may be configured to store information and to present a first and second output in response to (i) the input data stream and (ii) the periodic signal. The logic circuit may be configured to (i) detect a predetermined bit sequence and (ii) present a control signal in response to the information stored in the register circuit. The multiplexor circuit may be configured to present one or more multiplexed signals comprising the first and second outputs of the register circuit in response to the control signal.

18 Claims, 6 Drawing Sheets

¹ …

CIRCUITS AND METHODS FOR FRAMING ONE OR MORE DATA STREAMS

FIELD OF THE INVENTION

The present invention relates to framing data streams generally and, more particularly, to framing data streams to a SMPTE time reference.

BACKGROUND OF THE INVENTION

Conventional approaches to framing high speed data streams, such as SMPTE (Society of Motion Picture and Television Engineers) 259 M data streams, include providing a 30-input comparator that scans the decoded and descrambled data stream for a timing reference symbol (TRS) often represented as a sequence 3-FFh, 000h, 000h. When the comparator detects a match of all of the thirty bits, it resets a modulo-10 counter. This counter is used to mark the start and end points of the receive characters, and is also used to generate a character-rate output clock that may be provided synchronously to the output characters.

FIG. 1 illustrates a circuit 10 illustrating such a conventional approach. The circuit 10 generally shows a descrambled bit stream presented to a 30-bit AND gate 12 through a 30-bit shift register 13. The circuit 10 also comprises a MOD5 counter 14, a 10-bit register 16, an AND gate 18 and a toggle flip-flop 20. AdditionaL circuits receiving the character clock (i.e., the output of the toggle flip-flop 20) of the circuit 10 may encounter problems associated with creating a "phase-hop". "Phase-hop" generally occurs when the high or low phase of the output clock is reduced in size from its nominal width (i.e., a clock sliver), and also includes those cases where either (or both) of the high or low phase of the output clock is lengthened from its nominal width (i.e., a clock stretch). In a broadcast quality television system where video is a continuous bit-stream, this phase-hop may effect the output in a noticeable manner such as a visible distortion in the video signal.

SUMMARY OF THE INVENTION

The present invention concerns a circuit and method for framing an input data stream to a periodic signal. The circuit comprises a register circuit, a logic circuit and a multiplexor circuit. The register circuit may be configured to store information and to present a first and second output in response to (i) the input data stream and (ii) the periodic signal. The logic circuit may be configured to (i) detect a predetermined bit sequence and (ii) present a control signal in response to the information stored in the register circuit. The multiplexor circuit may be configured to present one or more multiplexed signals comprising the first and second outputs of the register circuit in response to the control signal.

The objects, features and advantages of the present invention include providing a circuit for framing an input data stream to a periodic signal while limiting the use of high speed logic and avoiding potential phase-hop problems by allowing the data stream to be synchronized with the clock while avoiding adjusting, stretching, trimming, slivering or otherwise modifying the character clock.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
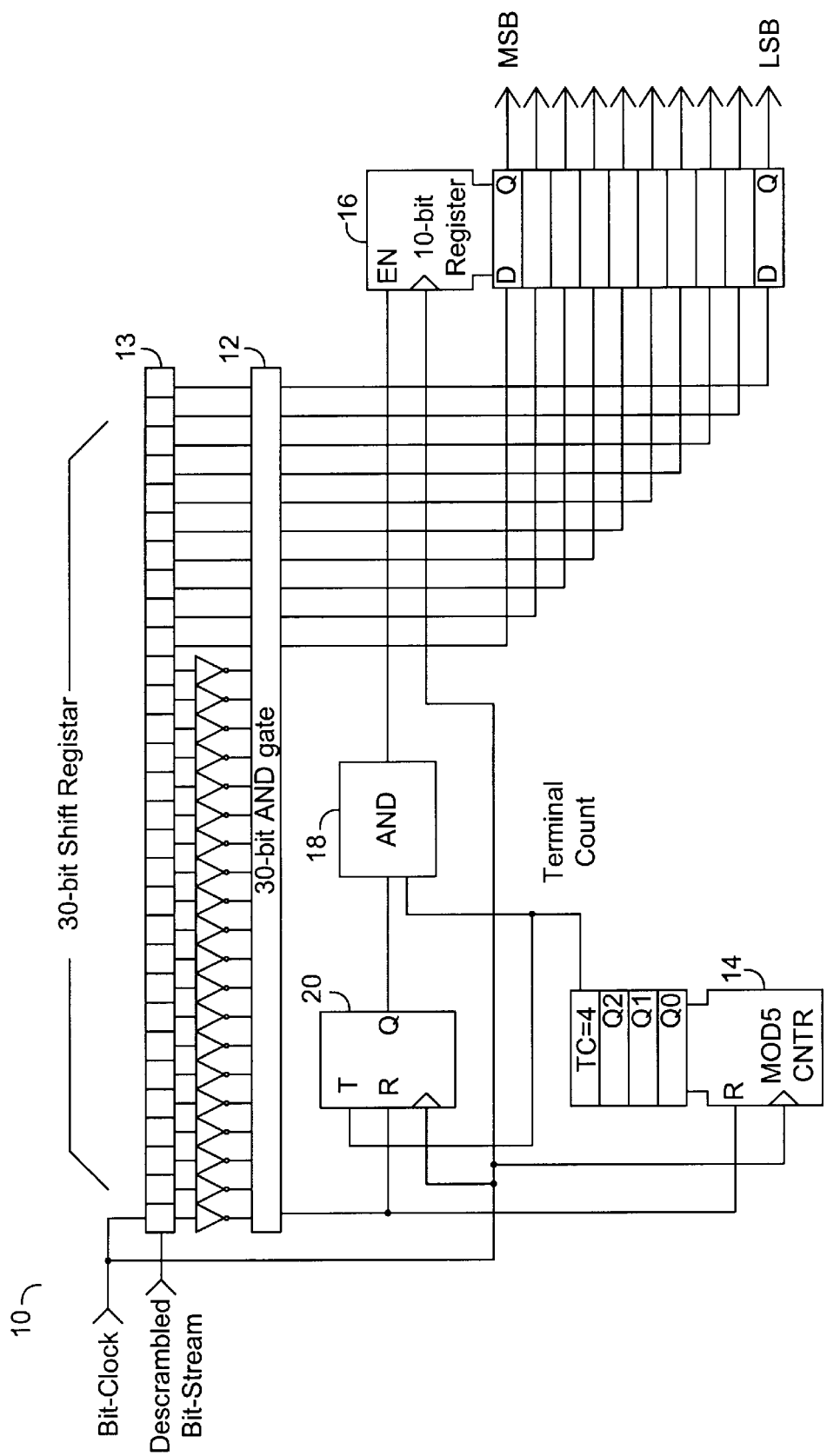
FIG. 1 is a block diagram of a conventional approach.
Figure 2:
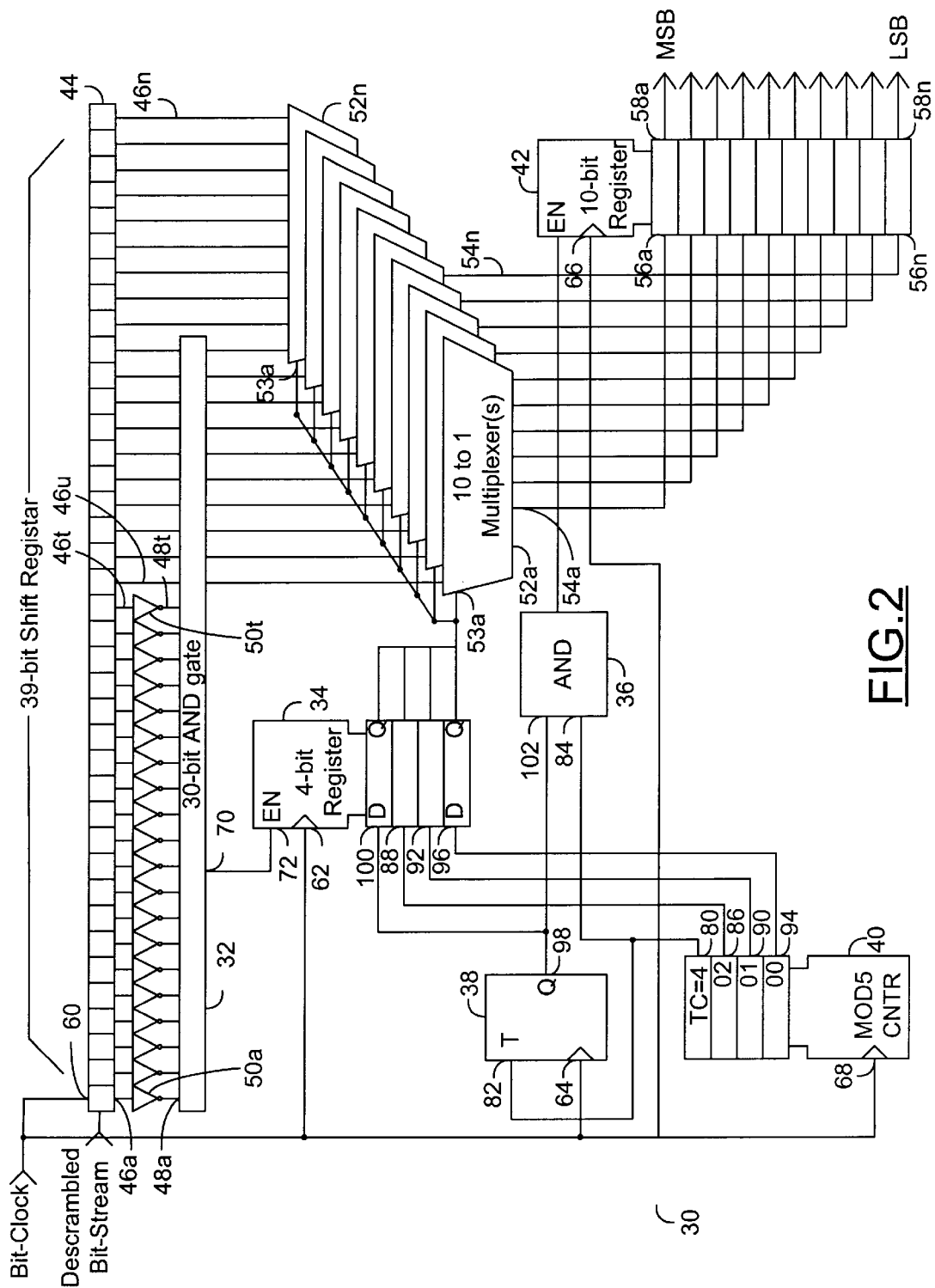
FIG. 2 is a block diagram of one embodiment of the present invention illustrating an improvement over the circuit of FIG. 1.

Referring to FIG. 2, a block diagram of a circuit 30 for framing a data stream in accordance with one embodiment of the present invention is shown. The circuit 30 generally comprises an AND gate 32, a register 34, an AND gate 36, a flip-flop 38, a counter 40, a register 42, a shift register 44 and a number of multiplexors 52a–52n. The shift register 44 generally receives a descrambled bit stream (e.g., an input data stream). The shift register 44 has a number of outputs 46a–46n that may be presented to a number of inputs 48a–48t of the AND gate 32 through a number of inverters 50a–50t. The outputs 46u–46n are generally presented to the AND gate 32. The multiplexors 52a–52n may each receive a subset of the outputs 46u–46n from the shift register 44. The multiplexors 52a–52n may also receive a control signal at an input 53a–53n. The multiplexor 52a generally presents an output 54a while the multiplexor 52n generally presents an output 54n. The outputs 54a–54n are generally presented to separate inputs of the register 42, with the outputs 54a–54n connecting to a respective input 56a–56n. The register 42 generally presents outputs 58a–58n that represent the most significant bit (MSB) through the least significant bit (LSB) of the output signal. The shift register 44 also has an input 60 that receives a bit-clock. The bit-clock is generally also presented to an input 62 of the register 34, an input 64 of the flip-flop 38, an input 66 of the register 42 and an input 68 of the counter 40. The AND gate 32 also has an output 70 that presents a match signal to an input 72 of the register 34.

The counter 40 has an output 80 that generally presents a signal to an input 82 of the flip-flop 38 as well as to an input 84 of the AND gate 36. The counter 40 also has an output 86 that may present a signal to an input 88 of the register 34. The counter 40 also has an output 90 that may present a signal to an input 92 of the register 34 and an output 94 that may present a signal to an input 96 of the register 34. The flip-flop 38 has an output 98 that may present a signal to an input 100 of the register 34 as well as to an input 102 of the AND gate 36.

Each of the components of the circuit 30 may operate at the same bit-rate as the interface providing the data. As an example, the bit-rate of 400 MBaud is generally equivalent to a 2.5 ns operation which may require fast logic to implement the structure.

Figure 3:
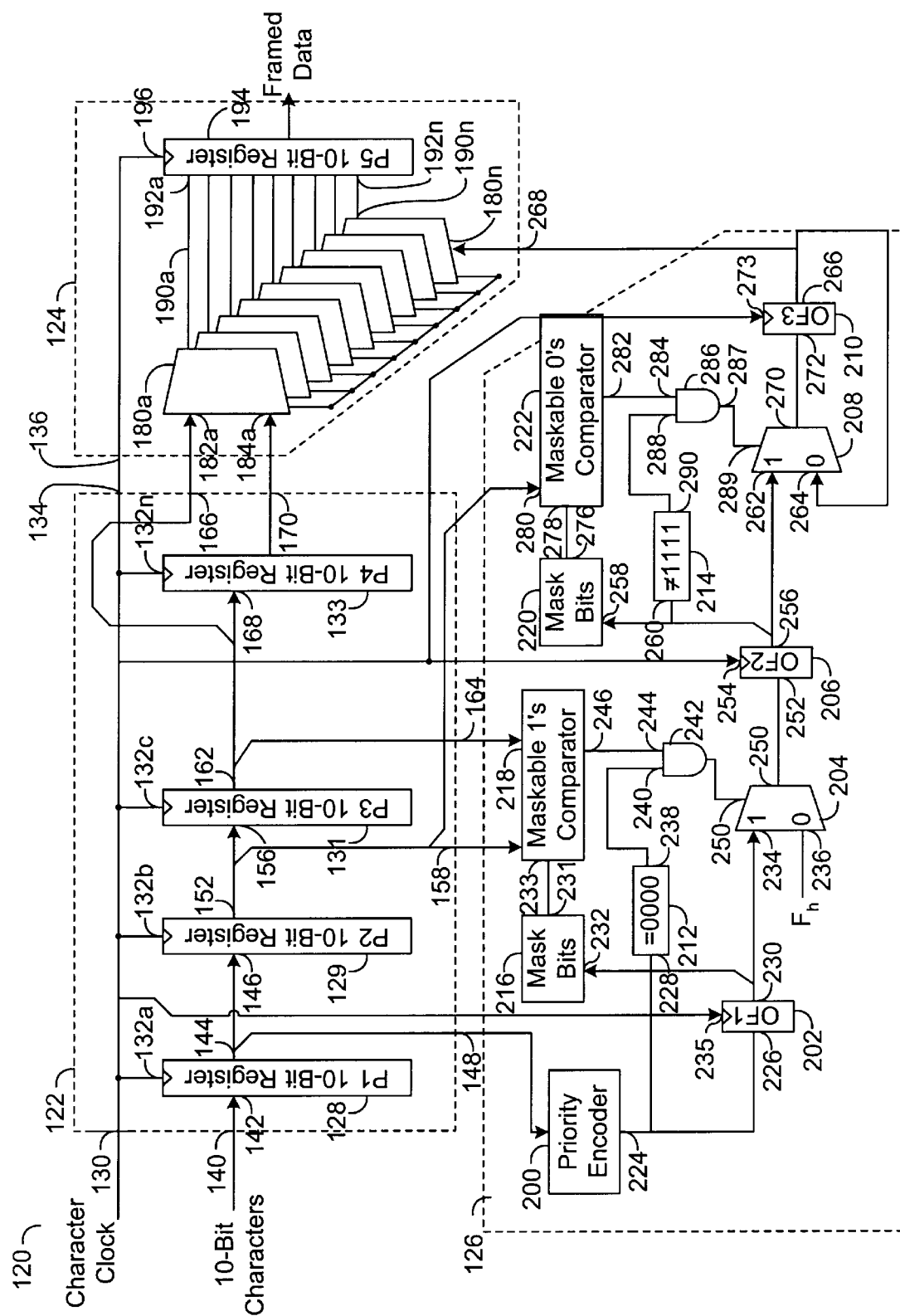
FIG. 3 is a block diagram illustrating a preferred embodiment of the present invention.

Referring to FIG. 3, a block diagram illustrating a circuit 120 in accordance with a preferred embodiment of the present invention is shown. The circuit 120 generally comprises a register block (or circuit) 122, a multiplexor block (or circuit) 124 and a logic block (or circuit) 126. The register block 122 generally comprises a P1 register 128, a P2 register 129, a P3 register 131 and a P4 register 133. Each of the registers P1–P4 may be implemented, in one example, as 10-bit registers. The register block 122 has an input 130 that generally receives a periodic signal (e.g., a character clock). The character clock is generally presented to a number of inputs 132a–132n of each of the registers P1–P4. The character clock may also be presented through an output 134 to an input 136 of the multiplexor block 124. The register block 122 also comprises an input 140 that generally receives a data input signal (e.g., an unframed 10-bit input data stream). The data input may be presented to an input 142 of the P1 register. The P1 register generally has an output 144 that may present a delayed version of the data input signal to an input 146 of the P2 register as well as to an output 148. The P2 register generally has an output 152 that may present a delayed version of the P1 register output 144 to an input 156 of the P3 register as well as to an output 158 and to an output 160. The P3 register has an output 162 that may present a signal to an output 164 and to an output 166. The output 162 may also present a signal to an input 168 of the P4 register.

The multiplexor block 124 generally comprises a number of multiplexors 180a–180n and a P5 register 194. Each of the multiplexors 180a–180n generally has an input 182a–182n and an input 184a–184n that may receive signals from the outputs 166 and 170, respectively. Additionally, each of the multiplexors 180a–180n may have a control input that may be received from the logic block 126. Each of the multiplexors 180a–180n may present a signal at an output 190a–190n to one of inputs 192a–192n of the P5 register 194. The P5 register also has an input 196 that receives the character clock signal.

The logic block 126 generally comprises an encoder 200, an offset register 202 (e.g., OF1), a multiplexor 204, an offset register 206 (e.g., OF2), a multiplexor 208, an offset register 210 (e.g., OF3), a zeros equality comparator block (or circuit) 212, a no-match detector block (or circuit) 214, a mask bits block 216, a maskable 1's comparator 218, a mask bits block 220 and a maskable 0's comparator 222. The zeros equality comparator block 212 may look for a value of 0000 from the encoder 200. In hardware, the zeros equality comparator block 212 may be implemented as a 4-input NOR gate. This decoding may also be generated directly from the input 148 of the encoder 200 using a single 10-input NOR gate. The encoder 200 may be implemented as a priority encoder. The encoder 200 has an output 224 that generally presents a signal to an input 226 of the offset register OF1 as well as to an input 228 of the zeros equality comparator block 212. The offset register OF1 generally has an output 230 that may present a signal to an input 232 of the masked bits block 216 as well as to an input 234 of the multiplexor 204. The offset register OF1 also has an input 235 that may receive the character clock signal. The mask bits block 216 has an output 231 that may present a signal to an input 233 of the maskable 1's comparator 218. The multiplexor 204 also has an input 236 that generally receives a signal Fh. The zeros equality comparator block 212 has an output 238 that may present a signal to an input 240 of an AND gate 242. The AND gate 242 also has an input 244 that may receive a signal from an output 246 of the maskable 1's comparator block 218. The AND gate 242 generally presents a signal to a control input 248 of the multiplexor 204.

The multiplexor 204 generally has an output 250 that may present a signal to an input 252 of the offset register OF2. The offset register OF2 also has an input 254 that may receive the character clock signal. The offset register OF2 also has an output 256 that may present a signal to an input 258 of the mask bits block 220, to an input 260 of the no match detector block 214, and to an input 262 of the multiplexor 208. The no-match detector block 214 may look for all values NOT equal to 1111 received from the output 256 of the offset register OF2. In hardware, the no-match detector block 214 may be implemented as a 4-input NAND gate. The multiplexor 208 also has an input 264 that may receive the feedback signal from an output 266 of the offset register OF3. The offset register OF3 also has an input 273 that may receive the character clock signal. The output 266 may also present a control signal to an input 268 of the multiplexor block 124. The multiplexor 208 has an output 270 that may present a signal to an input 272 of the offset register OF3. The mask bits block 220 has an output 276 that may present a signal to an input 278 of the maskable 0's comparator block 222. The maskable 0's comparator block 222 also has an input 280 that may be received from the output 160 of the register block 122. The maskable 0's comparator block 222 also has an output 282 that may present a signal to an input 284 of an AND gate 286. The AND gate 286 also has an input 288 that may be received from an output 290 of the no match detector block 214. The AND gate 286 has an output 287 that may present a signal to an input 289 of the multiplexor 208.

The circuit 120 generally performs a compare for a 30-bit TRS and alignment (framing) in a multi step process that will be described in detail in connection with FIGS. 4–8. The first step generally comprises locating the transition point between the 1's and the 0's in the data stream. Because the 10-bit characters are not framed, this offset can occur in any one of ten different positions. The following TABLE 1 shows the ten possible offsets that the bit stream can take as well as any "don't care" conditions generally represented as an "x" in a bit position within a character:

TABLE 1

| Possible TRS Offset Locations | | | | |
|---|---|---|---|---|
| T1 | T2 | T3 | T4 | Offset |
| 9876543210 | 9876543210 | 9876543210 | 9876543210 | (in bits) |
| xxxxxxxxxx | 0000000000 | 0000000000 | 1111111111 | 0 |
| xxxxxxxxx0 | 0000000000 | 0000000001 | 111111111x | 9 |
| xxxxxxxx00 | 0000000000 | 0000000011 | 11111111xx | 8 |
| xxxxxxx000 | 0000000000 | 0000000111 | 1111111xxx | 7 |
| xxxxxx0000 | 0000000000 | 0000001111 | 111111xxxx | 6 |
| xxxxx00000 | 0000000000 | 0000011111 | 11111xxxxx | 5 |
| xxxx000000 | 0000000000 | 0000111111 | 1111xxxxxx | 4 |
| xxx0000000 | 0000000000 | 0001111111 | 111xxxxxxx | 3 |
| xx00000000 | 0000000000 | 0011111111 | 11xxxxxxxx | 2 |
| x000000000 | 0000000000 | 0111111111 | 1xxxxxxxxx | 1 |
| 0000000000 | 0000000000 | 1111111111 | xxxxxxxxxx | no match |

The Tx (i.e., T1, T2, T3 and T4) columns generally indicate the relative position in the input data stream of each of the receive characters. The receive characters contained in the column labeled T4 generally immediately precedes the receive characters contained in the column labeled T3, which are generally received prior to the receive characters contained in the column labeled T2. The bit positions (i.e., 9876543210) generally indicate the position in the serial data stream where each bit (after decoding) exists. Since the least significant bit (LSB) of each source character is generally transmitted first, it is also generally received first. The columns T1–T4 show the relative contents of a series of the respective registers P1–P4 that carry the parallel 10-bit characters prior to framing by the multiplexor block 124.

The framing is generally determined by two items (i) the transition point between the 1's and the 0's and (ii) the presence of the predetermined 30-bits of a TRS on either side of the transition point. If the Tx columns of TABLE 1 generally reflect the possible contents of a series of pipeline registers P1–P4, then the transition point may be determined by locating the 0/1 transition when the data shown in the columns T3 and T4 is present in the P1 and P2 registers. The location of this transition may be preferably detected using the priority encoder 200 that searches for the location of the first "1" bit stored in the register P1. The all 1's condition is generally considered a "no match" since the character is generally properly framed but a 0/1 boundary has not yet been located.

The encoder 200 generally scans the register P1 to determine the position of the first "1", and then outputs a value based on the location of this bit. In one example, the values listed in the offset column of TABLE 1 are generated, along with a signal Fh for the no-match condition (i.e., when a "1" is detected in the most significant bit (MSB) position). The reference Fh is a hexadecimal representation of the four bit binary value of 1111. Since the values of 0000 (0h), 0001 (1h), 0010 (2h), 0011 (3h), 0100 (4h), 0101 (5h), 0110 (6h), 0111 (7h), 1000 (8h), and 1001 (9h) are used to represent actual offsets, some other value is generally needed to be used to represent the "no offset" condition. The present example takes an unused value of the existing four bits and use it as the "no offset" indication. The value of 1111 was selected since this can be detected using a simple 4-input AND gate. However other values may be implemented in accordance with the design criteria of a particular application. For example, similar functionality may be implemented with other specific values being presented by the encoder 200. However, the values must generally be different for each 0-to-1 transition location. The all 1's condition may generate multiple patterns. However, these patterns must generally not match any of the location-detected 5 patterns. The value may then be captured in the offset register OF1 on the following clock cycle, and the data in the register P1 may generally be passed to the register P2. The offset register OF1 generally acts as a pipeline register. Since there are ten possible offset locations, the offset register OF1 generally requires a minimum of four flip-flops to capture, store and present the captured value.

Figure 4:
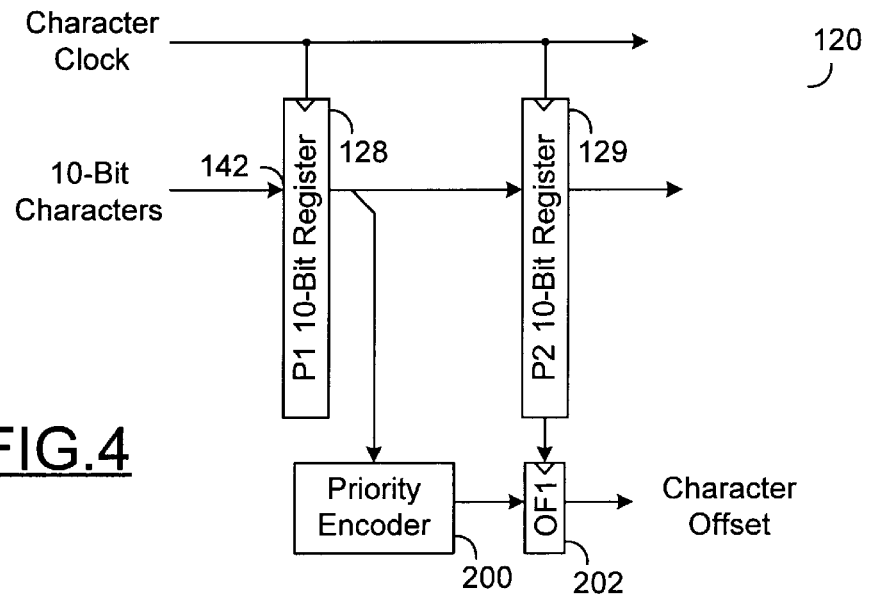
FIG. 4 is a block diagram of the 0/1 detection circuit of FIG. 3.

FIG. 4 illustrates a portion of the circuit 120 that may be used for detecting a 0/1 transition in the input data stream. The portion of the circuit 120 shown generally comprises the register P1, the register P2, the priority encoder 200 and the register OF1. The ten-bit characters presented as the data input are generally presented to an input 142 of the register P1. To limit decoding delays, it may be desirable to store information in the register OF1 as individual bits (i.e., one-hot encoded bits), where a separate flip-flop holding each possible offset location may be implemented. However, other logic and register combinations may be implemented accordingly to meet the design criteria of a particular application.

Figure 5:
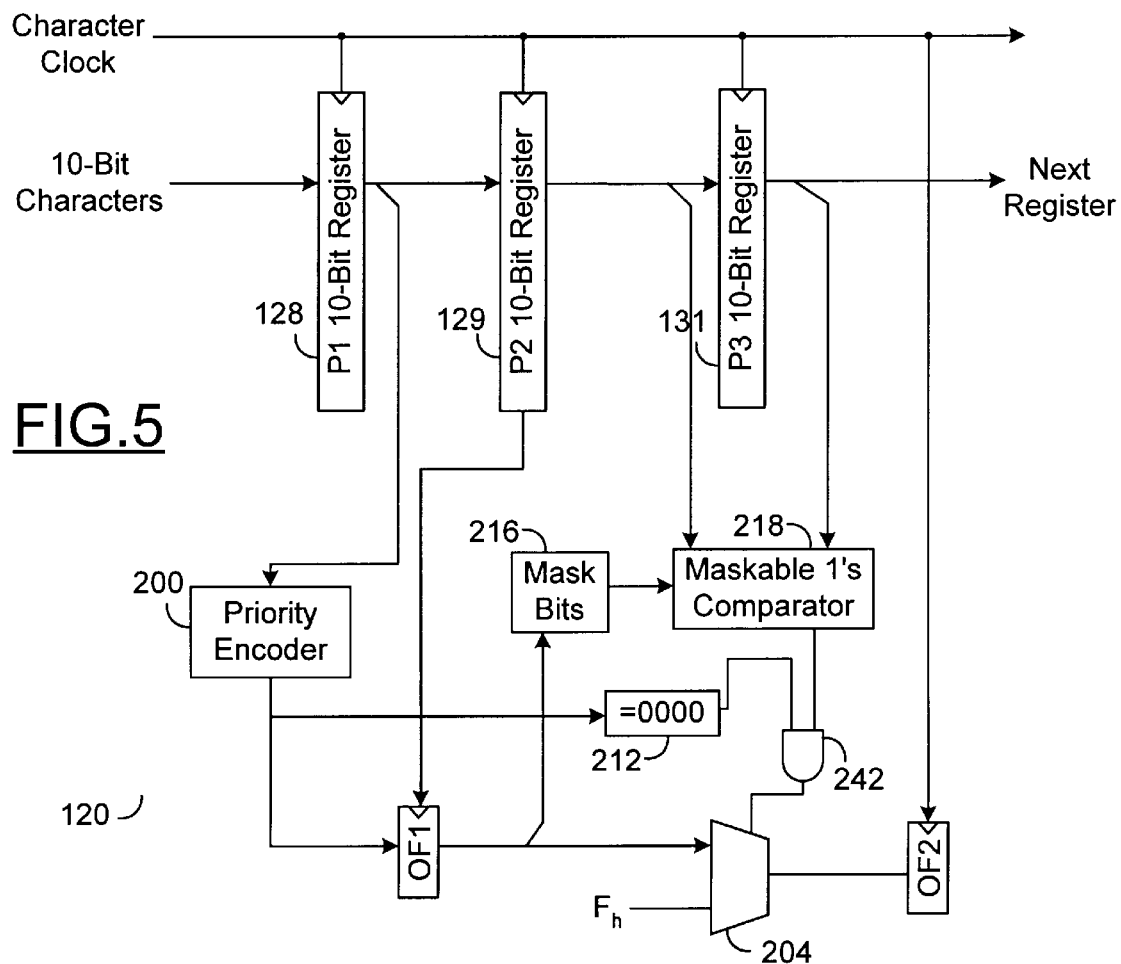
FIG. 5 is a block diagram illustrating the maskable comparator connections.

Referring to FIG. 5, a larger portion of the circuit 120 is shown. The additional components not included in FIG. 4 include the P3 register 131, the multiplexor 204, the zeros equality comparator block 212, the mask bits block 216, the maskable 1's comparator block 218, the AND gate 242 and the offset register OF2.

Figure 6:
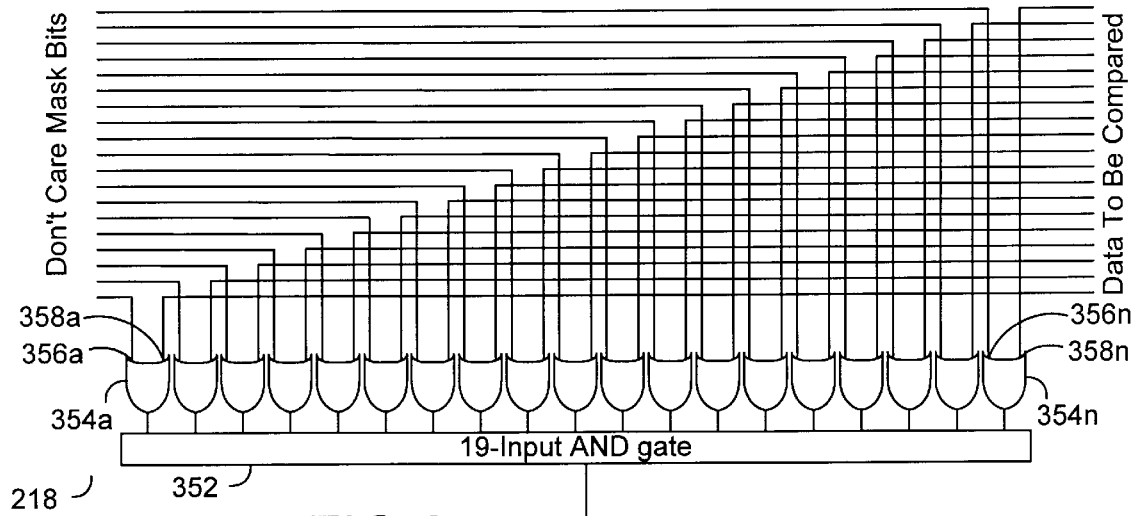
FIG. 6 is a block diagram of a maskable ones comparator.

Referring to FIG. 6, a circuit diagram of a maskable 1's comparator block 218 is shown which may be used to implement the maskable 1's comparator. The maskable 1's comparator block 218 generally comprises an N-bit AND gate 352 and a number of OR gates 354a–354n. Each of the OR gates 354a–354n generally has an input 356a–356n and an input 358a–358n. The inputs 356a–356n generally receive "don't care" mask bits from the mask bits block 216, while the inputs 358a–358n generally receive data bits to be compared from the register P2 and the register P3. The maskable 1's comparator block 218 may be used to compare data stored in the registers P2 and P3 with the particular bits that would make up the first possible character of a valid TRS. The comparison may be done by masking the gate 352 to verify a first number (e.g., 10) 1's of the TRS. The mask bits block 216 may use an offset pointer to pass a 19-bit constant to the OR/AND structure of the maskable 1's comparator block 218 that may be gated with the information stored registers P2 and P3. This constant forces both the don't care bits (i.e., the bits preceding the TRS) and the known 0 bits (i.e., those bits after the 0/1 transition) to a "1" during the compare operation.

The compare operation across the registers P2 and P3 generally only requires 19-bits in size since the MSB of the register P2 may be set at a 0 to generate a valid offset pointer. As a result, the mask bits block generally generates the "don't care" mask bits as a decode or look-up table that may be derived from the offset information captured in the offset register OF1 on the previous clock. Generally, the data to be compared, presented at the outputs 158 and 164, may comprise the contents of the register P3 and the lower-ordered 9-bits of the register D22.

The following TABLE 2 illustrates the various mask bit constants generated by the mask bit logic block 216 when presented with the various values from the offset register OF1.

| Offset | (LSB) Mask Bits(MSB) |
| --- | --- |
| 0000 | 0000000000111111111 |
| 1001 | 1000000000011111111 |
| 1000 | 1100000000001111111 |
| 0111 | 1110000000000111111 |
| 0110 | 1111000000000011111 |
| 0101 | 1111100000000001111 |
| 0100 | 1111110000000000111 |
| 0011 | 1111111000000000011 |
| 0010 | 1111111100000000001 |
| 0001 | 1111111110000000000 |

The "1 bits" output from the mask bits block 216 generally indicate the don't care mask bits and the known 0 bits locations, and may be determined by the contents of the offset register OF1. The don't care mask bits and the known 0 bits may be presented to the maskable 1's comparator 218 and, through OR gate inputs 356a–356n, cause those respective inputs to the 19-input AND gate 352 to be driven to a "1". The output of the AND gate 352 in the maskable 1's comparator 218 generally transitions high when the remaining bit locations in the registers P2 and P3 are all 1's.

Referring back to TABLE 1, it is generally apparent that the time slot T2 in all valid offset locations of the TRS may be all 0's. The all 0's condition may be partially decoded by the priority encoder 200 (i.e., an output of a 0000 at the output 224). The zeros comparator 212 checks for this condition (i.e., an input of 0000 at the output 228) and may generate an output 238 that may be gated, through the AND gate 242, with the output 246 of the maskable 1's comparator 218 to control the data loaded into the offset register OF2. To simplify decoding, it may be desirable to replace the zeros equality comparator block 212 with a 10-input NOR gate, with the output 148 of the register circuit 122 connected to the input of the 10-input NOR gate. When a valid compare is indicated by both the maskable 1's comparator 218 and the zeros equality comparator block 212 being TRUE, the value stored in the offset register OF1 generally passes through the input 234 of the multiplexor 204 to a second offset register OF2. If a valid match is not indicated, the register OF2 is generally loaded with a value that does not represent any valid offset. This may be the same value (e.g., Fh) used to indicate a no-match condition in the offset register OF1.

Figure 7:
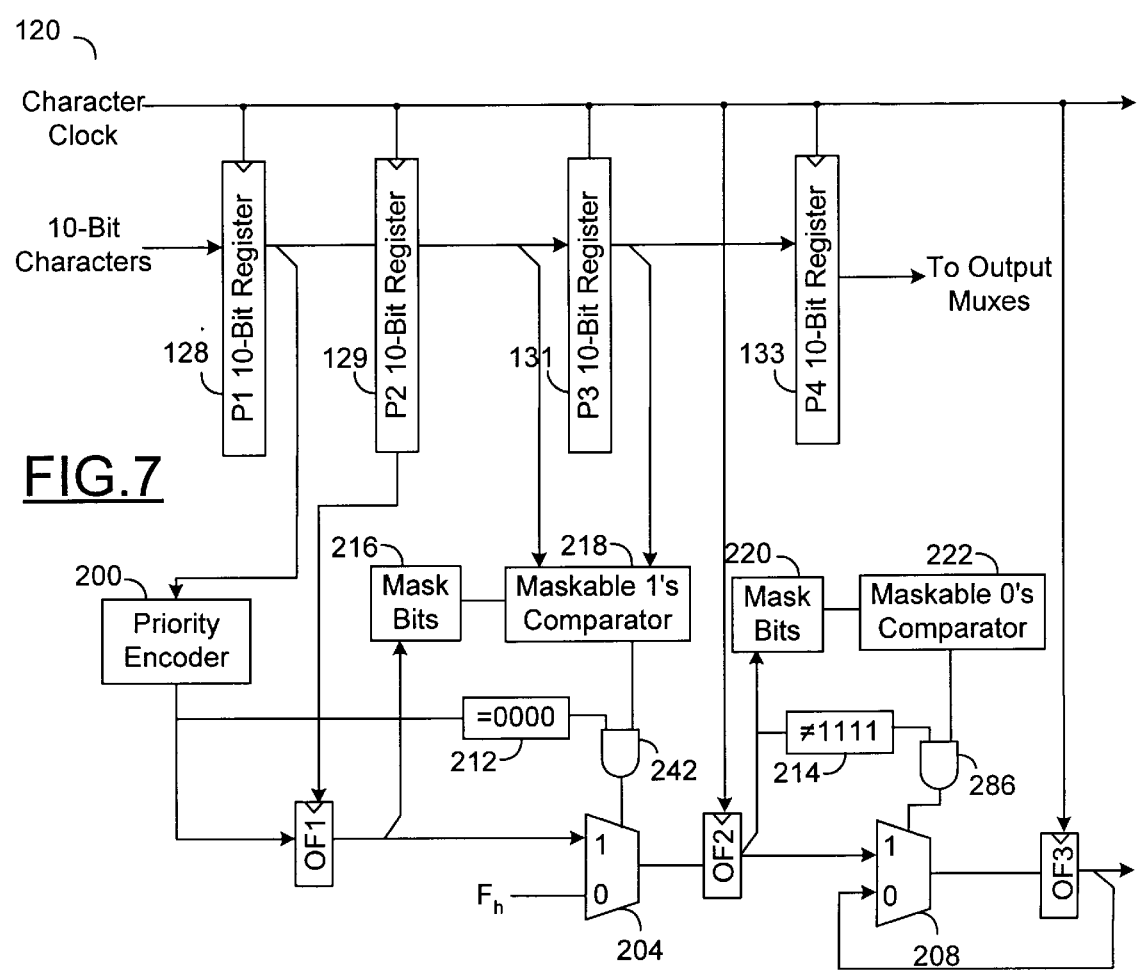
FIG. 7 is a block diagram illustrating the maskable comparator connections.

Referring to FIG. 7, a larger portion of the circuit 120 is shown including the P4 register 133, the offset register OF3, the multiplexor 208, the no match detector block 214, the masked bits block 220 and the maskable 0's comparator 222. These additional components may check for the match of the remaining bits of the TRS. If a match is not found, then the offset register OF3 may maintain its previous offset.

Figure 8:
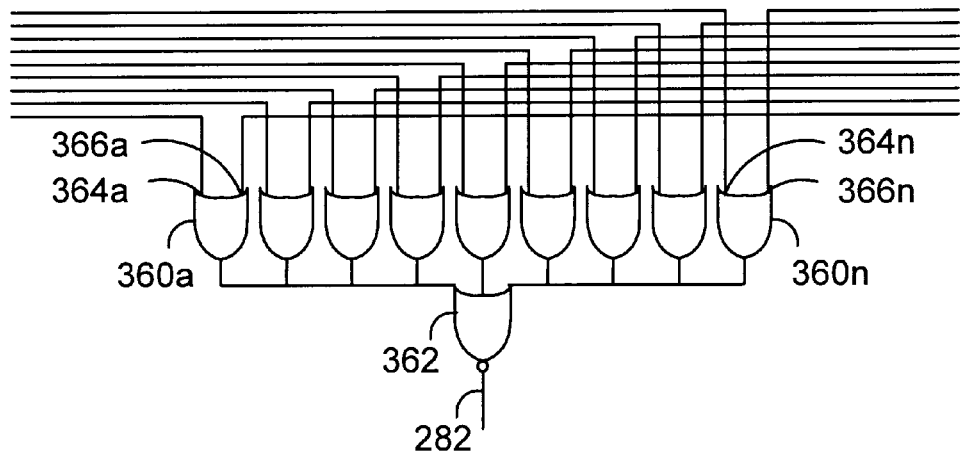
FIG. 8 a block diagram of a maskable zeros comparator.

At this point in the operation of the circuit 120, a minimum of twenty-one bits have generally been matched to the TRS sequence, and possibly as many as all thirty bits. Next, the circuit 120 generally validates the remaining bits (if any) of the TRS. In general, the remaining bits should all be 0's. The presence of the remaining 0's may be checked using the maskable 0's comparator 222. Since the maskable 0's comparator 222 may be checking for 0's, the comparator logic may be implemented using an AND/NOR structure as shown in FIG. 8 (as contrasted with the OR/AND structure used in the 1's comparator). However, the 0's comparator 222 may be implemented with other logic gates in accordance with the design criteria of a particular application.

Referring to FIG. 8, a detailed diagram of the maskable 0's comparator 222 is shown. The maskable 0's comparator 222 generally comprises a number of AND gates 360a–360n. Each of the gates may present an output received by the NOR gate 362 which in turn may present the output 282 of the maskable 0's comparator 222. Each of the gates 360a–360n generally comprise an input 364a–364n that may receive the don't care mask bits and an input 366a–366n that may receive the data to be compared.

The don't care mask bits may be genera ted as a decode or table-look-up from the offset information captured in the offset register OF2 through th e mask bits block 220. The data to be compared generally comprises the lower-order nine-bits of the register P2. The following TABLE 3 lists the don't care mask bits presented to the maskable 0's comparator 222 by the mask bits block 220, when specific offset values are input from the output 256 of the register OF2:

TABLE 3

| Offset | (LSB) Mask Bits (MSB) |
|--------|-----------------------|
| 0000   | 000000000             |
| 1001   | 100000000             |
| 1000   | 110000000             |
| 0111   | 111000000             |
| 0110   | 111100000             |
| 0101   | 111110000             |
| 0100   | 111111000             |
| 0011   | 111111100             |
| 0010   | 111111110             |

If a 0's match is found, and the no-match detector block 214 indicated that the offset register OF2 contains a valid offset value, then the TRS has been validated and the offset value present in the OF2 register is loaded into the offset register OF3 as described in more detail in connection with FIG. 7.

After the offset is validated and captured in the offset register OF3, the offset is then used to route the data present in the registers P3 and P4 to the output register P5. The final routing is generally implemented using a plurality of multiplexors 180a–180n. In the example where ten offset values are present, a set of ten 10-to-1 multiplexors may be implemented. The multiplexors 180a–180n generally operate in a similar fashion to a barrel shifter, with the exception that they generally do not provide an end-around carry operation. The mapping of the signals between the registers P3 and P4 to the output register P5 for each of the offset locations is generally shown by the following TABLE 4:

TABLE 4

| Offset | P5-9 (MSB) | P5-8 | P5-7 | P5-6 | P5-5 | P5-4 | P5-3 | P5-2 | P5-1 | P5-0 (LSB) |
|--------|------------|------|------|------|------|------|------|------|------|------------|
| 0000   | P4-9       | P4-8 | P4-7 | P4-6 | P4-5 | P4-4 | P4-3 | P4-2 | P4-1 | P4-0       |
| 1001   | P3-0       | P4-9 | P4-8 | P4-7 | P4-6 | P4-5 | P4-4 | P4-3 | P4-2 | P4-1       |
| 1000   | P3-1       | P3-0 | P4-9 | P4-8 | P4-7 | P4-6 | P4-5 | P4-4 | P4-3 | P4-2       |
| 0111   | P3-2       | P3-1 | P3-0 | P4-9 | P4-8 | P4-7 | P4-6 | P4-5 | P4-4 | P4-3       |
| 0110   | P3-3       | P3-2 | P3-1 | P3-0 | P4-9 | P4-8 | P4-7 | P4-6 | P4-5 | P4-4       |
| 0101   | P3-4       | P3-3 | P3-2 | P3-1 | P3-0 | P4-9 | P4-8 | P4-7 | P4-6 | P4-5       |
| 0100   | P3-5       | P3-4 | P3-3 | P3-2 | P3-1 | P3-0 | P4-9 | P4-8 | P4-7 | P4-6       |
| 0011   | P3-6       | P3-5 | P3-4 | P3-3 | P3-2 | P3-1 | P3-0 | P4-9 | P4-8 | P4-7       |
| 0010   | P3-7       | P3-6 | P3-5 | P3-4 | P3-3 | P3-2 | P3-1 | P3-0 | P4-9 | P4-8       |
| 0001   | P3-8       | P3-7 | P3-6 | P3-5 | P3-4 | P3-3 | P3-2 | P3-1 | P3-0 | P4-9       |

In general, the circuit 120 may be configured to handle a continuous stream of data and may be capable of detecting each of the components of a TRS on each clock cycle. Since the TRS sequence is generally three characters in length, and may span four non-framed characters, the minimum interval between new values being loaded into the offset register OF3 may be slightly over three characters.

Since the circuit 120 generally operates using a slower character clock (rather than a high speed bit-clock), the circuit 120 may be implemented in a slower, lower power (and generally less expensive) technology. Since the circuit 120 generally operates by aligning the data to the character clock, as opposed to aligning the character clock to the data, the character clock generally remains stable throughout the detection and framing operation. Specifically, there are generally no phase hops or other clock artifacts caused by the circuit 120.

While the invention has been particularly shown and described with reference to the preferred embodiments thereof, it will be understood by those skilled in the art that various changes in form and details may be made without departing from the spirit and scope of the invention.

I claim:

1. A circuit for framing an input data stream to a periodic signal, comprising:
    a register circuit comprising a plurality of registers configured to store information and to present a first output and a second output in response to (i) said input data stream and (ii) said periodic signal;
    a logic circuit comprising a first comparator circuit configured to present a first output signal in response to a comparison between (i) the information stored in a second and third one of said plurality of registers and (ii) information stored in a first offset register, said logic circuit configured to (i) detect a predetermined bit sequence and (ii) present a control signal; and
    a multiplexor circuit configured to present one or more multiplexed signals comprising said first output and said second output in response to said control signal.

2. The circuit according to claim 1, wherein the information stored in said first offset register is generated in response to information stored in a first one of said plurality of registers.

3. The circuit according to claim 2, wherein said logic circuit further comprises:
    a second comparator circuit configured to present a second output signal in response to a comparison between (i) the information stored in said second register and (ii) information stored in a second offset register.

4. The circuit according to claim 3, wherein the information stored in said second offset register is generated in response to (i) the information stored in said first offset register and (ii) the first output signal.

5. The circuit according to claim 3, wherein said logic circuit further comprises:
    a third offset register configured to store information in response to (i) the information stored in said second offset register, (ii) a feedback of the information stored in the third offset register and (iii) the second output signal.

6. The circuit according to claim 5, wherein said third offset register is configured to generate said control signal in response to the information stored in said third offset register.

7. The circuit according to claim 1, wherein said predetermined bits sequence comprises a timing reference symbol (TRS).

8. The circuit according to claim 1, wherein said multiplexed signal comprises a multi-bit signal.

9. The circuit according to claim 8, wherein said first output and said second output of said register circuit each comprise a multi-bit signal.

10. The circuit according to claim 9, wherein said multiplexor circuit comprises a plurality of multiplexors each configured to present a bit of said multiplexed signal in response to said control signal.

11. The circuit according to claim 1, wherein said logic circuit further comprises an encoder circuit configured to present the information to said first offset register.

12. A circuit for framing an input data stream to a timing signal, comprising:
    an input register comprising a plurality of registers configured to present an output in response to (i) said input data stream and (ii) said timing signal;
    a logic circuit comprising a first comparator circuit configured to present a first output signal in response to a comparison between (i) the information stored in a second and third one of said plurality of registers and (ii) information stored in a first offset register, said logic circuit configured to (i) detect a predetermined bit sequence and (ii) present a control signal;
    a multiplexor circuit configured to present a multiplexed signal in response to (i) said input data stream and (ii) said control signal; and
    an output register configured to present one or more output signals in response to said one or more multiplexed signals.

13. The circuit according to claim 12, wherein said timing signal comprises a bit clock signal.

14. The circuit according to claim 12, wherein said a control signal is generated in response to (i) said timing signal and (ii) said input data stream.

15. The circuit according to claim 12, wherein said multiplexed signal comprises a multi-bit signal.

16. The circuit according to claim 15, wherein said input register circuit stores and presents a plurality of bits as a multi-bit signal.

17. The circuit according to claim 16, wherein said multiplexor circuit comprises a plurality of multiplexors each configured to present one of said multiplexed signals.

18. The circuit according to claim 12, wherein said predetermined bit sequence comprises a timing reference symbol (TRS).

* * * * *